(12) United States Patent
Faur-Ghenciu et al.

(10) Patent No.: US 7,238,333 B2
(45) Date of Patent: Jul. 3, 2007

(54) HIGH ACTIVITY WATER GAS SHIFT CATALYSTS WITH NO METHANE FORMATION

(75) Inventors: Anca Faur-Ghenciu, King of Prussia, PA (US); Sailesh Mullapudi, Phoenixville, PA (US); Mark R. Feaviour, Reading (GB); Nathan E. Trusty, Philadelphia, PA (US); Jessica G. Reinkingh, Malvern, PA (US)

(73) Assignee: General Motors Corporation, Detroit, MI (US)

( * ) Notice: Subject to any disclaimer, the term of this patent is extended or adjusted under 35 U.S.C. 154(b) by 38 days.

(21) Appl. No.: 10/803,799

(22) Filed: Mar. 18, 2004

(65) Prior Publication Data

US 2005/0207958 A1    Sep. 22, 2005

(51) Int. Cl.
| | |
|---|---|
| B01J 23/02 | (2006.01) |
| B01J 23/04 | (2006.01) |
| B01J 23/10 | (2006.01) |
| C01B 3/16 | (2006.01) |
| C01B 31/20 | (2006.01) |

(52) U.S. Cl. ............... 423/247; 423/437.2; 423/656; 502/303; 502/304

(58) Field of Classification Search ............. 423/655, 423/656, 247, 437.2; 502/303, 304
See application file for complete search history.

(56) References Cited

U.S. PATENT DOCUMENTS 5,134,042 A    7/1992    Madou et al.

(Continued)

FOREIGN PATENT DOCUMENTS

EP    0320243    12/1988

(Continued)

OTHER PUBLICATIONS

Liu et al., Abstract: "Reduction of sulfur dioxide by carbon monoxide to elemental sulfur over composite oxide catalysts", Applied Catalysis B: Environmental, vol. 4, Issues 2-3, Sep. 13, 1994, pp. 167-186.

(Continued)

*Primary Examiner*—Wayne A. Langel
(74) *Attorney, Agent, or Firm*—Dinsmore & Shohl LLP

(57) ABSTRACT

A method of reducing an amount of carbon monoxide in process fuel gas in a water gas shift converter with no methane formation. The method includes placing a high activity water gas shift catalyst system into a water gas shift converter; and passing the process fuel gas through the water gas shift converter in effective contact with the high activity water gas shift catalyst system and converting a portion of the carbon monoxide in the process fuel gas into carbon dioxide and hydrogen by a water gas shift reaction with no methane formation at a temperature in a range of about 200° C. to about 425° C. The high activity water gas shift catalyst system can include a noble metal; a support consisting essentially of cerium oxide, or a mixed metal oxide of cerium oxide-zirconium oxide or cerium oxide-lanthanum oxide wherein cerium oxide is present in an amount ranging from about 80% to about 20% by weight of total metal oxide and wherein zirconium oxide or lanthanum oxide is present in an amount ranging from about 20% to about 80% by weight of total metal oxide; an anti-methanation agent comprising at least one compound selected from copper compounds, manganese compounds, iron compounds, or combinations thereof; and optionally a promoter comprising at least one metal selected from alkali metals and alkaline earth metals. Alternatively, the high activity water gas shift catalyst system can include a support consisting essentially of a mixed metal oxide of cerium oxide-copper oxide or zirconium oxide-copper oxide wherein cerium oxide or zirconium oxide is present in an amount ranging from about 80% to about 50% by weight of mixed metal oxide, and wherein copper oxide is present in an amount ranging from about 20% to about 50% by weight of mixed metal oxide; optionally a noble metal; and optionally a promoter comprising at least one metal selected from alkali metals and alkaline earth metals.

44 Claims, 9 Drawing Sheets

U.S. PATENT DOCUMENTS

| | | | |
|---|---|---|---|
| 5,256,172 A | 10/1993 | Keefer | |
| 5,458,857 A | 10/1995 | Collins et al. | |
| 5,464,606 A | 11/1995 | Buswell et al. | |
| 5,648,545 A | 7/1997 | Reif et al. | |
| 5,916,702 A | 6/1999 | Marucchi-Soos et al. | |
| 6,090,312 A | 7/2000 | Ziaka et al. | |
| 6,162,267 A | 12/2000 | Priegnitz et al. | |
| 6,190,623 B1 | 2/2001 | Sanger et al. | |
| 6,218,326 B1 | 4/2001 | Datta et al. | |
| 6,244,367 B1 | 6/2001 | Ahmed et al. | |
| 6,254,807 B1 | 7/2001 | Schmidt et al. | |
| 6,280,864 B1 | 8/2001 | Towler et al. | |
| 6,299,995 B1 | 10/2001 | Abdo et al. | |
| 6,342,197 B1 | 1/2002 | Senetar et al. | |
| 6,375,924 B1 | 4/2002 | Towler et al. | |
| 6,409,939 B1 | 6/2002 | Abdo et al. | |
| 6,409,974 B1 | 6/2002 | Towler et al. | |
| 6,413,479 B1 | 7/2002 | Kudo et al. | |
| 6,436,354 B1 | 8/2002 | Priegnitz et al. | |
| 6,455,182 B1 * | 9/2002 | Silver | 429/17 |
| 6,562,315 B2 * | 5/2003 | Korotkikh et al. | 423/656 |
| 6,723,298 B1 * | 4/2004 | Baumann et al. | 423/437.2 |
| 6,756,339 B1 * | 6/2004 | Rokicki et al. | 502/304 |
| 6,790,432 B2 * | 9/2004 | Ruettinger et al. | 423/656 |
| 6,846,475 B1 * | 1/2005 | Taguchi et al. | 423/656 |
| 7,144,566 B2 * | 12/2006 | Anzai et al. | 423/648.1 |
| 2002/0122764 A1 | 9/2002 | Shore et al. | 423/437.2 |
| 2002/0131915 A1 | 9/2002 | Shore et al. | 422/177 |
| 2002/0147103 A1 * | 10/2002 | Ruettinger et al. | 502/66 |
| 2003/0007912 A1 | 1/2003 | Silver | |
| 2003/0186804 A1 | 10/2003 | Wagner et al. | |
| 2003/0235526 A1 | 12/2003 | Vandersrspurt et al. | |
| 2004/0175327 A1 * | 9/2004 | Hagemeyer et al. | 423/656 |
| 2004/0176245 A1 * | 9/2004 | Hagemeyer et al. | 502/337 |
| 2004/0184986 A1 * | 9/2004 | Hagemeyer et al. | 423/656 |

FOREIGN PATENT DOCUMENTS

| | | |
|---|---|---|
| JP | 06254414 A | 9/1994 |
| JP | 07039755 A | 2/1995 |
| WO | WO 02/090247 A1 | 11/2002 |
| WO | WO 2004/083116 A1 | 9/2004 |

OTHER PUBLICATIONS

Li et al., "Low temperature water-gas shift reaction over Cu- and Ni-loaded cerium oxide catalysts", Applied Catalysis B: Environmental 27 (2000), pp. 179-191, no month.

Liu et al., "Transition metal/fluorite-type oxides as active catalysts for reduction of sulfur dioxide to elemental sulfur by carbon monoxide", Catalysis Today 28 (1996), pp. 391-403, no month.

Zhu et al., Abstract: "Redox chemistry over $CeO_2$-based catalysts: $SO_2$ reduction by CO or $CH_4$", Catalysis Today, vol. 50, Issue 2, Apr. 29, 1999, pp. 381-397.

"Activity and Stability of CU—CeO2 Catalysts in High Temperature Water-Gas Shift for Fuel-Cell Applications" Xiaomei Qi and Maria Flytzani-Stephanopoulos, Ind. Eng. Chem Res. 2004, 43, 3055-3062, no month.

Great Britain Search Report dated Jan. 12, 2005 for corresponding Great Britain application GB09415342.5.

* cited by examiner

HIGH ACTIVITY WATER GAS SHIFT CATALYSTS WITH NO METHANE FORMATION

BACKGROUND OF THE INVENTION

The present invention relates generally to a process for generating hydrogen, and more particularly to a process for reducing the amount of carbon monoxide in process fuel gas in a water gas shift converter, and to high activity water gas shift catalyst systems for use in such a process.

In a fuel cell, electrical power is generated by a chemical reaction. The most common fuel cells involve the chemical reaction between a reducing agent, such as hydrogen, and an oxidizing agent, such as oxygen. In order to be used in such a fuel cell, hydrocarbon fuel must first be converted into a hydrogen-rich stream.

Fuel processing systems to convert hydrocarbon fuel into a hydrogen-rich stream generally include three principal sections: a primary reactor, a water gas shift converter, and a carbon monoxide cleanup system.

In the primary reactor, the preheated fuel/steam/air mixture comes in contact with the reforming catalysts, and the fuel is converted into products including hydrogen, carbon monoxide, carbon dioxide, and methane. Temperatures in this section typically range from 650–800° C. Various types of primary reactors can be used, such as steam reformers, auto-thermal reformers, and partial oxidation reformers.

High levels of carbon monoxide in the feed stream for the fuel cell can poison the anode electrodes of the fuel cell. As a result, the level of carbon monoxide in the process gas must be reduced before the process gas can be sent to the fuel cell. In the water gas shift converter, the products of the primary reactor are placed in contact with one or more water gas shift catalysts. The carbon monoxide reacts with water to produce hydrogen and carbon dioxide, reducing the concentration of carbon monoxide in the process gas. This reaction is known as the water gas shift reaction. Temperatures in the water gas shift converter are generally in the range of 200–600° C.

The final section of the fuel processing system is the carbon monoxide cleanup system. This section is designed to ensure that the hydrogen stream is of suitable quality for use in a proton exchange membrane (PEM) fuel cell (i.e., typically the carbon monoxide concentration is less than 50 ppm). This is usually described as a subsystem because several different types of catalytic, membrane and/or adsorption sections are combined as a unit, usually also including various heat exchangers.

Water gas shift converters are well known. They typically include a chamber with an inlet for the process gas from the primary reactor to enter and an outlet for the process gas to pass to the carbon monoxide cleanup system. There is a catalytic reaction zone between the inlet and the outlet. The catalytic reaction zone includes a catalyst for converting carbon monoxide to carbon dioxide by the water gas shift reaction according to the following equation:

$$CO + H_2O \rightarrow CO_2 + H_2$$

This reaction not only reduces the carbon monoxide concentration, it also increases the carbon dioxide and hydrogen concentrations of the process gas.

Water gas shift catalysts are known. High temperature (400–450° C.) water gas shift catalysts include iron oxide, chromic oxide, and mixtures thereof. Other water gas shift catalysts include copper, zinc, iron, chromium, nickel, and cobalt compositions, as well as platinum, palladium, rhodium, gold, and ruthenium. Noble metals combined with cerium oxide have been used as water gas shift catalysts. However, they have a relatively low level of activity. U.S. Pat. No. 6,455,182 discloses a water gas shift catalyst which includes a noble metal on a support of mixed metal oxides, in which at least two of the oxides are cerium oxide and zirconium oxide. The cerium oxide and zirconium oxide are present in the range of about 50 to 30 mole % zirconium (42 to 23 wt % zirconia) to 50 to 70 mole % cerium (58 to 77 wt % ceria). The patent limits the amount of zirconium to not less than 30 mole % (23 wt % zirconia) so that the zirconium provides enhanced stability to the catalyst, and not more than 50 mole % (42 wt % zirconia) to prevent phases which are only zirconium oxide and/or only cerium oxide.

There remains a need for high activity water gas shift catalyst systems and for methods of using such catalyst systems.

SUMMARY OF THE INVENTION

This need is met by the present invention which provides high activity water gas shift catalyst systems and methods for using them. The high activity water gas shift catalyst system of the present invention has no methane formation at a temperature in a range of about 200° C. to about 425° C., and in some cases up to about 450° C., about 500° C., about 550° C., or about 600° C.

A method of reducing the amount of carbon monoxide in process fuel gas in a water gas shift converter with no methane formation is disclosed. The method includes placing one of the high activity water gas shift catalyst systems into a water gas shift converter, and passing the process fuel gas through the water gas shift converter in effective contact with the high activity water gas shift catalyst system and converting a portion of the carbon monoxide in the process fuel gas into carbon dioxide and hydrogen by the water gas shift reaction with no methane formation at a temperature in a range of about 200° C. to about 350° C. The maximum catalyst activity occurs at a temperature in the range of about 200° C. to about 475° C., with a temperature in the range of about 250° C. to about 425° C. being desirable.

In one embodiment, the catalyst system includes a noble metal; a support consisting essentially of cerium oxide, a mixed metal oxide of cerium oxide-zirconium oxide, wherein cerium oxide is present in an amount ranging from about 20% to about 80% by weight of mixed metal oxide, and zirconium oxide is present in an amount ranging from about 80% to about 20% by weight of mixed metal oxide, or a mixed metal oxide of cerium oxide-lanthanum oxide wherein cerium oxide is present in an amount ranging from about 20% to about 80% by weight of mixed metal oxide, and lanthanum oxide is present in an amount ranging from about 80% to about 20% by weight of mixed metal oxide; an anti-methanation agent comprising at least one compound selected from copper compounds, manganese compounds, iron compounds, or combinations thereof; and optionally a promoter comprising at least one metal selected from alkali metals and alkaline earth metals. As used herein, the term "mixed metal oxide" includes both single phase metal oxides and mixtures of metal oxides (more than one phase).

Copper compounds are generally present in an amount ranging from about 0.1% to about 10% by total weight of catalyst. Manganese compounds are generally present in an amount ranging from about 0.1% to about 5% by total weight of catalyst. Iron compounds are generally present in an amount ranging from about 0.1% to about 5% by total weight of catalyst.

Suitable noble metals include, but are not limited to, platinum, palladium, ruthenium, iridium, and mixtures thereof. The noble metal is generally present in an amount ranging from about 1% to about 4% by weight of total catalyst.

The high activity water gas shift catalyst system optionally includes a promoter. Suitable promoters include, but are not limited to, cesium, lithium, rubidium, potassium, magnesium, strontium, barium, or combinations thereof. The promoter is generally present in an amount of between about 0.1% and about 1% by weight of total catalyst.

An alternate embodiment includes a support consisting essentially of a mixed metal oxide of cerium oxide-copper oxide wherein cerium oxide is present in an amount ranging from about 80% to about 50% by weight of mixed metal oxide, and copper oxide is present in an amount ranging from about 20% to about 50% by weight of mixed metal oxide, or a mixed metal oxide of zirconium oxide-copper oxide wherein zirconium oxide is present in an amount ranging from about 80% to about 50% by weight of mixed metal oxide, and copper oxide is present in an amount ranging from about 20% to about 50% by weight of mixed metal oxide; optionally a noble metal; and optionally a promoter comprising at least one metal selected from alkali metals and alkaline earth metals.

DETAILED DESCRIPTION OF THE INVENTION

Figure 1:
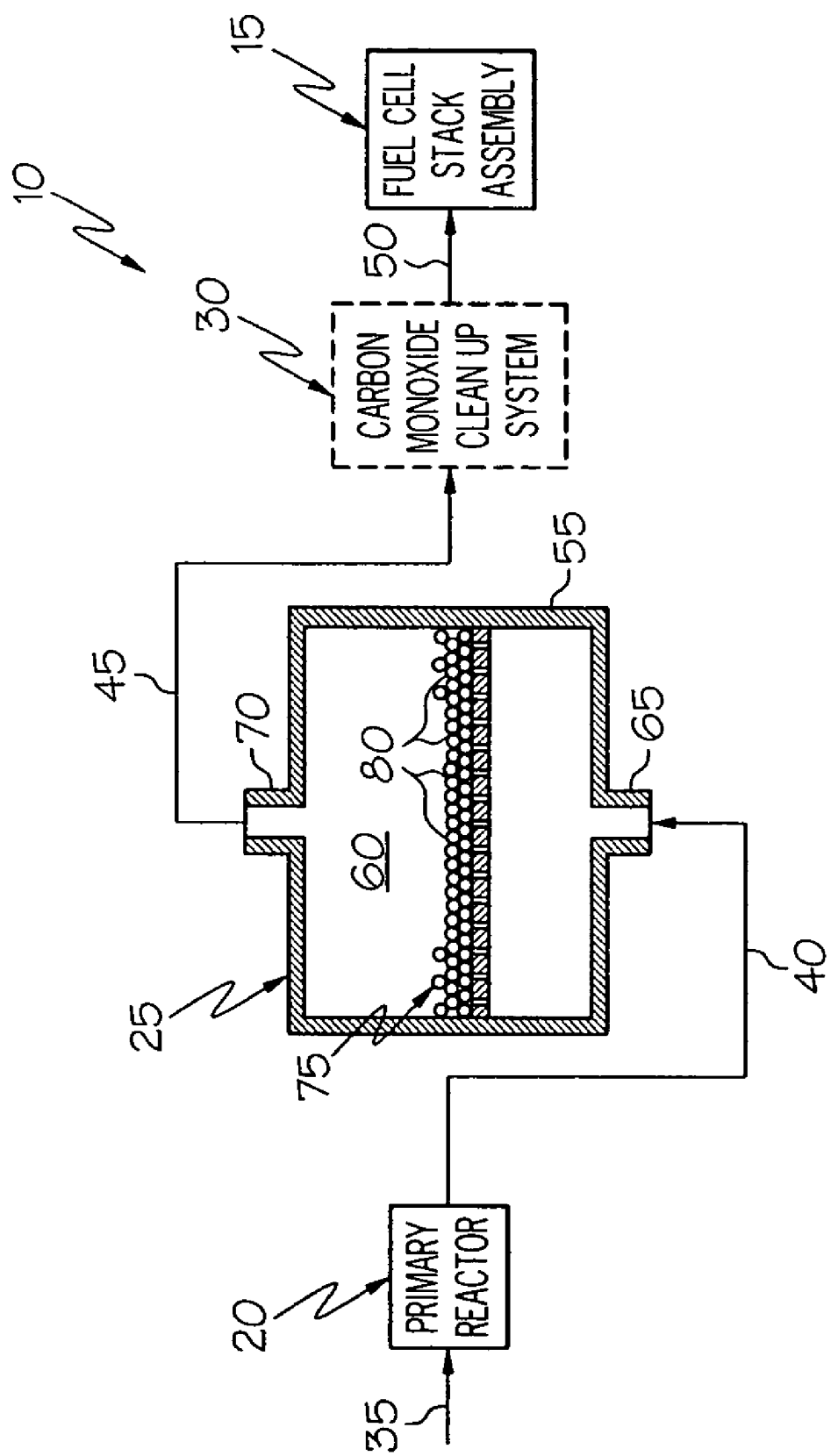
FIG. 1 is a schematic diagram of a fuel processing system for a fuel cell using a water gas shift catalyst system according to the present invention.
Figure 2:
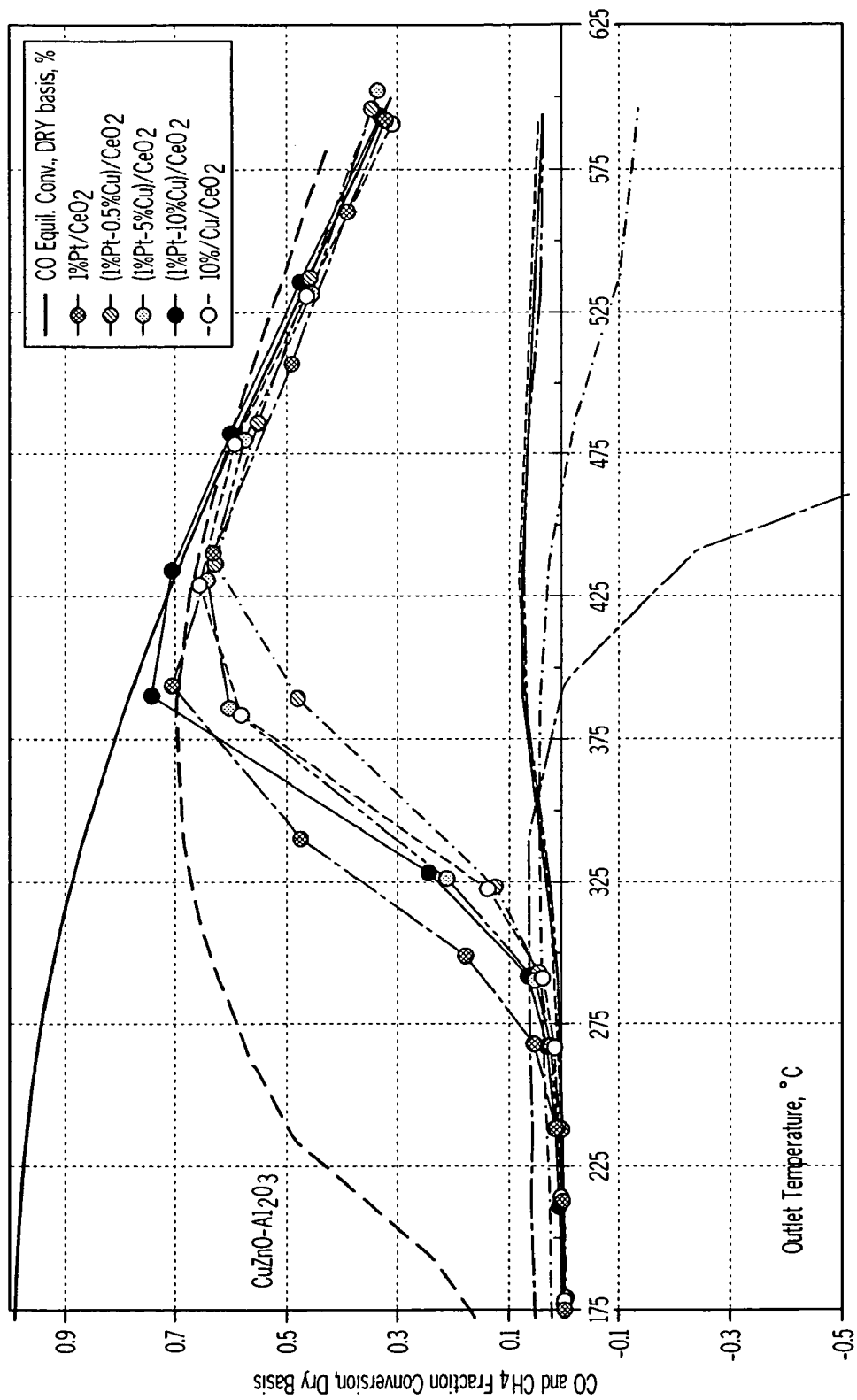
FIG. 2 is a graph showing catalyst activity and methane formation for cerium oxide catalysts of the present invention, in comparison with 1% Pt/$CeO_2$.
Figure 3:
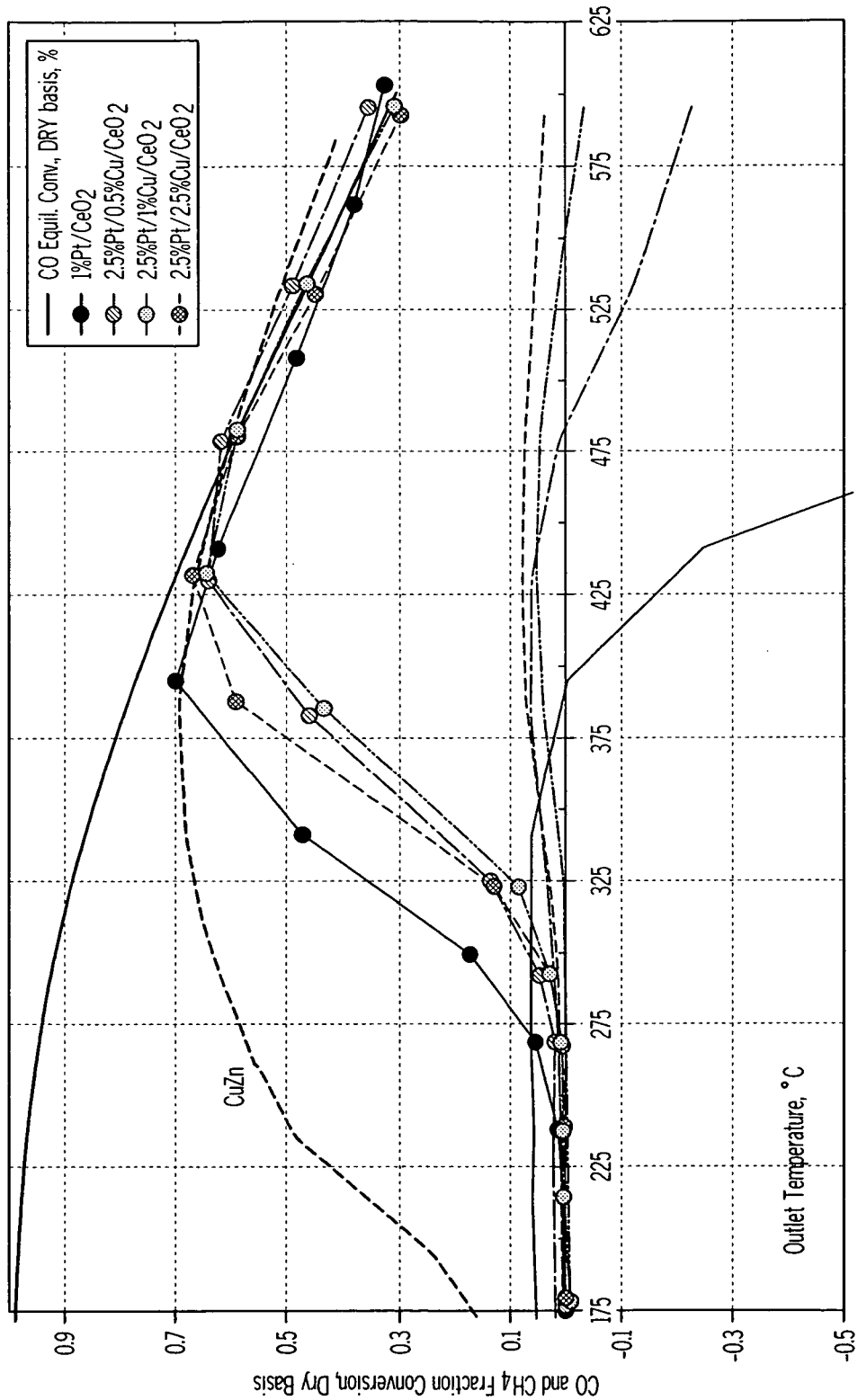
FIG. 3 is a graph showing catalyst activity and methane formation for cerium oxide catalysts of the present invention, in comparison with 1% Pt/$CeO_2$.
Figure 4:
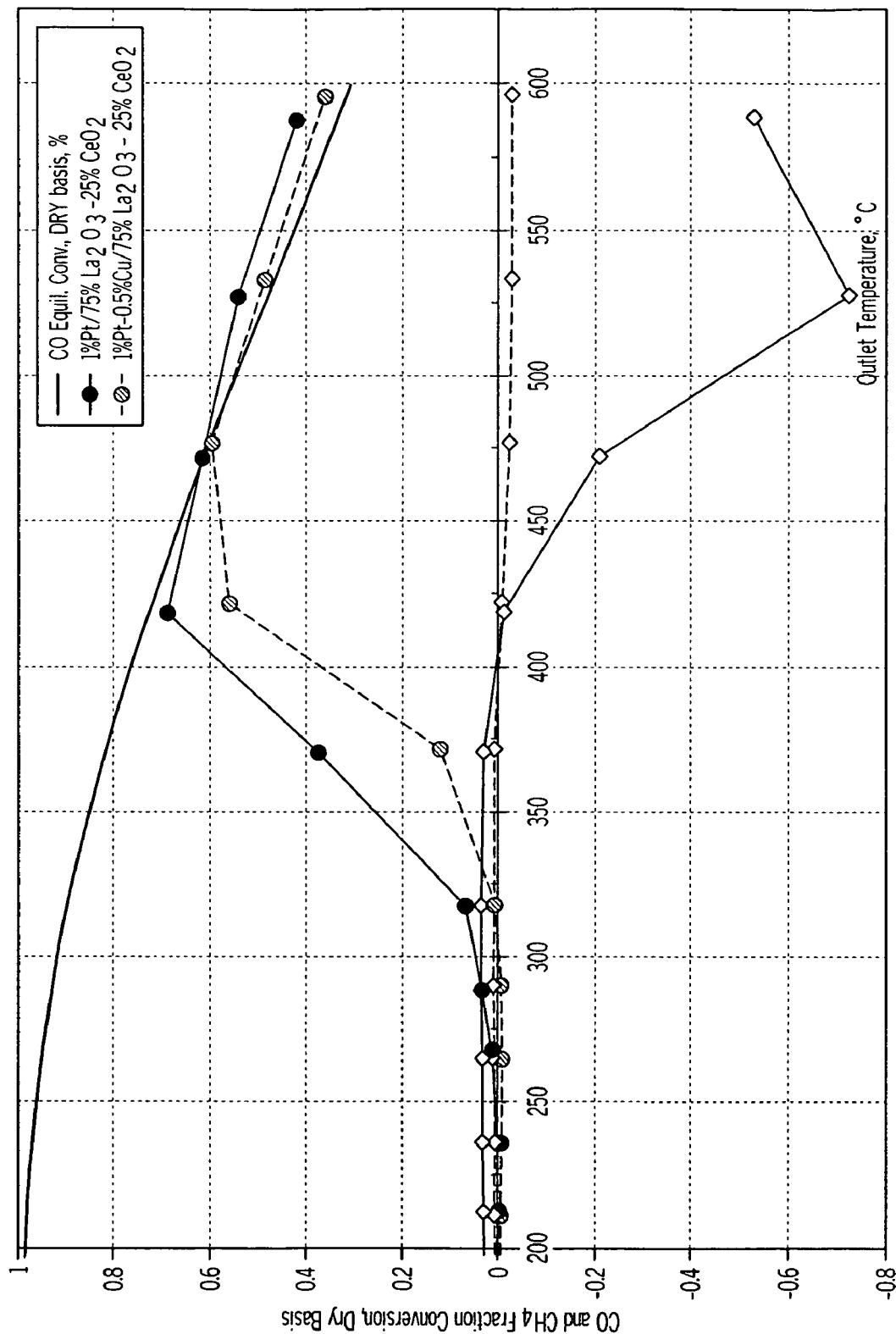
FIG. 4 is a graph showing catalyst activity and methane formation for lanthanum oxide-cerium oxide catalysts of the present invention.
Figure 5:
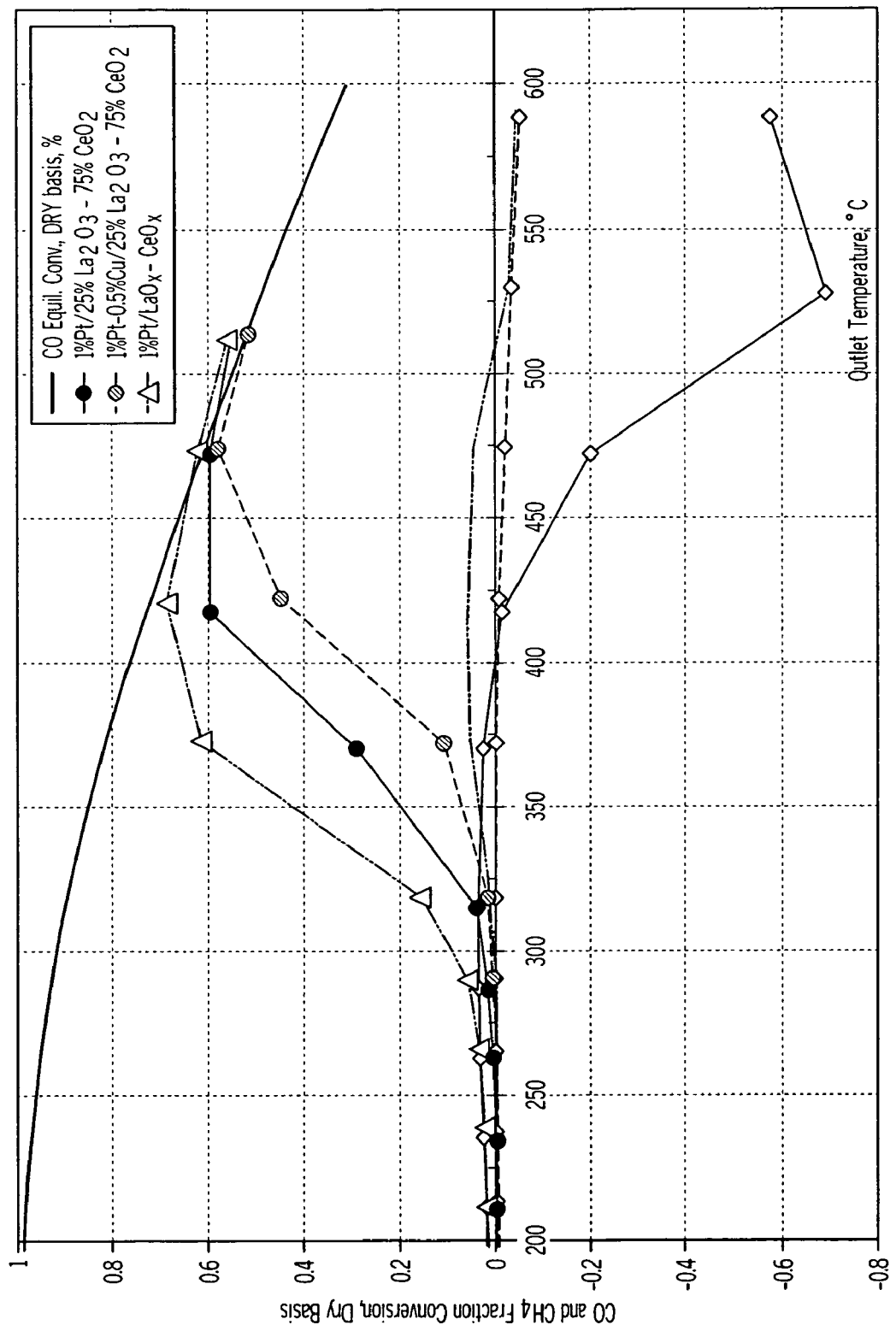
FIG. 5 is a graph showing catalyst activity and methane formation for lanthanum oxide-cerium oxide catalysts of the present invention.

FIG. 1 shows a schematic diagram for a fuel processing system 10 for a fuel cell stack assembly 15. The fuel cell stack assembly 15 is of conventional design and construction. The fuel processing system 10 includes a primary reactor 20, a water gas shift converter 25, and a carbon monoxide cleanup system 30. The fuel processing system 10 converts a hydrocarbon fuel source into a hydrogen-rich stream which is supplied as fuel to the fuel cell stack assembly 15. The hydrocarbon fuel source is fed into the primary reactor 20 through inlet 35. Depending on the type of primary reactor used, air and/or steam are also provided. The hydrocarbon fuel and steam and/or air react in the presence of an appropriate catalyst to produce hydrogen, carbon monoxide, carbon dioxide, and residual water in the primary reactor 20.

After exiting from the primary reactor 20, the process gas flows through channel 40 to the water gas shift converter 25. The water gas shift reaction shown above takes place in the water gas shift converter 25. The process gas then flows through channel 45 to the carbon monoxide cleanup system 30, if necessary. The optional carbon monoxide cleanup system 30 further reduces the amount of carbon monoxide in the process gas stream. The process gas stream, which is hydrogen-rich and has an acceptably low concentration of carbon monoxide, then flows through channel 50 to the fuel cell stack assembly 15.

The water gas shift converter 25 includes a housing 55 which defines a catalyst chamber 60. The catalyst chamber 60 has an inlet 65 and an outlet 70. The process gas enters catalyst chamber 60 through inlet 65 from the primary reactor 20 and channel 40. The process gas exits the catalyst chamber 60 through outlet 70, and then flows through channel 45 to the carbon monoxide cleanup system 30. The catalyst chamber 60 includes one or more catalyst beds 75. The process gas from the primary reactor enters through inlet 65 and flows through the catalyst bed 75. The catalyst bed 75 includes the water gas shift catalyst system 80 of the present invention. Although the water gas shift catalyst system is shown as a bed, it will be understood by those of skill in the art that the catalyst could be supported by other arrangements, as are well known in the art. For example, honeycomb structures made of ceramic, alumina, cordierite, or the like could also be used.

In one embodiment, the water gas shift catalyst system of the present invention includes a noble metal. Suitable noble metals include, but are not limited to, platinum, palladium, ruthenium, iridium, and mixtures thereof. The noble metal is dispersed on or in the lattice of the support. The noble metal can be present in an amount of between about 1% to about 4% by weight of total catalyst. The use of platinum is desirable because it has a temperature range in which no methane formation takes place even in the absence of an anti-methanation agent. Palladium and ruthenium methanate throughout the entire temperature range in the absence of the anti-methanation agent.

The catalyst system also includes a support. The support consists essentially of cerium oxide, or a mixed metal oxide of cerium oxide-zirconium oxide, wherein cerium oxide is present in an amount ranging from about 20% to about 80% by weight of mixed metal oxide, and zirconium oxide is present in an amount ranging from about 80% to about 20% by weight of mixed metal oxide, or a mixed metal oxide of cerium oxide-lanthanum oxide wherein cerium oxide is present in an amount ranging from about 20% to about 80% by weight of mixed metal oxide, and lanthanum oxide is present in an amount ranging from about 80% to about 20% by weight of mixed metal oxide.

The catalyst system includes an anti-methanation agent comprising at least one compound selected from copper compounds, manganese compounds, iron compounds, or combinations thereof. The anti-methanation agent can be added either as a surface promoter or as dopant, i.e., incorporated into the oxide lattice upon preparation of the oxide.

Copper compounds are generally present in an amount ranging from about 0.1% to about 10% by total weight of catalyst. Manganese compounds are generally present in an amount ranging from about 0.1% to about 5% by total weight of catalyst. Iron compounds are generally present in an amount ranging from about 0.1% to about 5% by total weight of catalyst.

Alternatively, the high activity water gas shift catalyst system comprises a support consisting essentially of a mixed metal oxide of cerium oxide-copper oxide, wherein cerium oxide is present in an amount ranging from about 80% to about 50% by weight of mixed metal oxide, and copper oxide is present in an amount ranging from about 20% to about 50% by weight of mixed metal oxide, or a mixed metal oxide of zirconium oxide-copper oxide wherein zirconium oxide is present in an amount ranging from about 80% to about 50% by weight of mixed metal oxide, and copper oxide is present in an amount ranging from about 20% to about 50% by weight of mixed metal oxide; optionally a noble metal; and optionally a promoter comprising at least one metal selected from alkali metals and alkaline earth metals.

The catalyst system can optionally include a promoter. The promoter can be one or more alkali or alkaline earth metals. Suitable promoters include, but are not limited to, cesium, lithium, rubidium, potassium, magnesium, strontium, barium, or combinations thereof. The promoter can be present in an amount ranging from about 0.1% to about 1% by weight of total catalyst. Although the reasons are not clear and although not wishing to be bound by theory, the promoters are believed to improve the water adsorption/chemisorption properties of the oxidic support.

Catalysts according to the present invention were made and tested for catalyst activity and methane formation.

Some catalysts were made by the incipient wetness method. First, the adsorption factor was determined for each oxide support. The platinum group metal (PGM) solution volume necessary to get the catalyst completely "soaked" was determined from the adsorption factor (the pre-determined adsorption volume plus ten percent excess water to allow thorough mixing). The precursor of the PGM component to be deposited on the oxide support was in the form of concentrated PGM solution. The component to be deposited on the oxide support was added to the pre-determined PGM solution volume, and the solution was mixed at room temperature. When needed, this solution was subsequently diluted with deionized water, to reach the pre-determined volume necessary to perform the incipient wetness, and added slowly to the powder oxide support under continuous mixing, at room temperature. The solution was impregnated onto the oxide support, with thorough mixing. The mixture was dried for between about 2–5 hours at 125° C. in an oven, either with air circulation or without it. During the drying process, the wet powder was taken out periodically and re-mixed. The dried mixture was then calcined in a furnace at 500° C. for about 2 hours without air circulation.

For formulations containing more than one deposited component (two PGM or one PGM and one promoter), the incipient wetness method was performed either sequentially (sequential impregnation) or simultaneously (co-impregnation or co-incipient wetness). This is shown by the way the formulations are written. A/B/oxide means sequential impregnation: B impregnated onto the oxide followed by drying and calcination, then A impregnated onto the oxide followed by drying and calcinations. (A–B)/oxide means co-impregnation of A and B on the oxide.

Another method used was coprecipitation of the PGM precursor together with the mixed oxide precursors. For example, premixed Pt and Zr salts in one flask and premixed Ce and Mn salts in another flask were added simultaneously to a solution of sodium hydroxide, followed by curing the precipitate, filtration, washing to a neutral pH, and drying and calcination as described above.

CuOx—CeOx mixed oxides were formed by co-precipitation. Premixed Cu and Ce salt solutions in one flask and sodium hydroxide from another flask were simultaneously dropped into a reactor containing distilled water, at a constant pH of about 11. Alternatively, Cu and Ce salts in an acid solution were added to a solution of sodium hydroxide. In both cases, this was followed by filtering, washing, drying, and calcination.

LaOx—CeOx mixed oxides were co-precipitated from a basic solution (having a pH of at least 8) comprising La and Ce salts.

The water gas shift catalyst systems were tested using a fixed bed reactor, with 1 g catalyst, and 1 g cordierite both sized at 45–60 mesh. The tests were performed at 67,500 cc/g cat/hr weight hourly space velocity, using a process gas stream containing 8% carbon monoxide, 30% water, 10% carbon dioxide, 32.5% hydrogen, 1% methane, with the balance being nitrogen. During the test, the temperature was increased from about 150° C. to about 450° C. or to about 600° C. and then held constant such that steady state temperatures and steady state conversions were obtained.

The results of the testing are shown in FIGS. 2–9. FIGS. 2–5 compare the effect of the level of copper as an anti-methanation agent, for Pt on different oxide supports (ceria and ceria-lanthana at different oxide ratios $CeO_2 : La_2O_3$).

Figure 6:
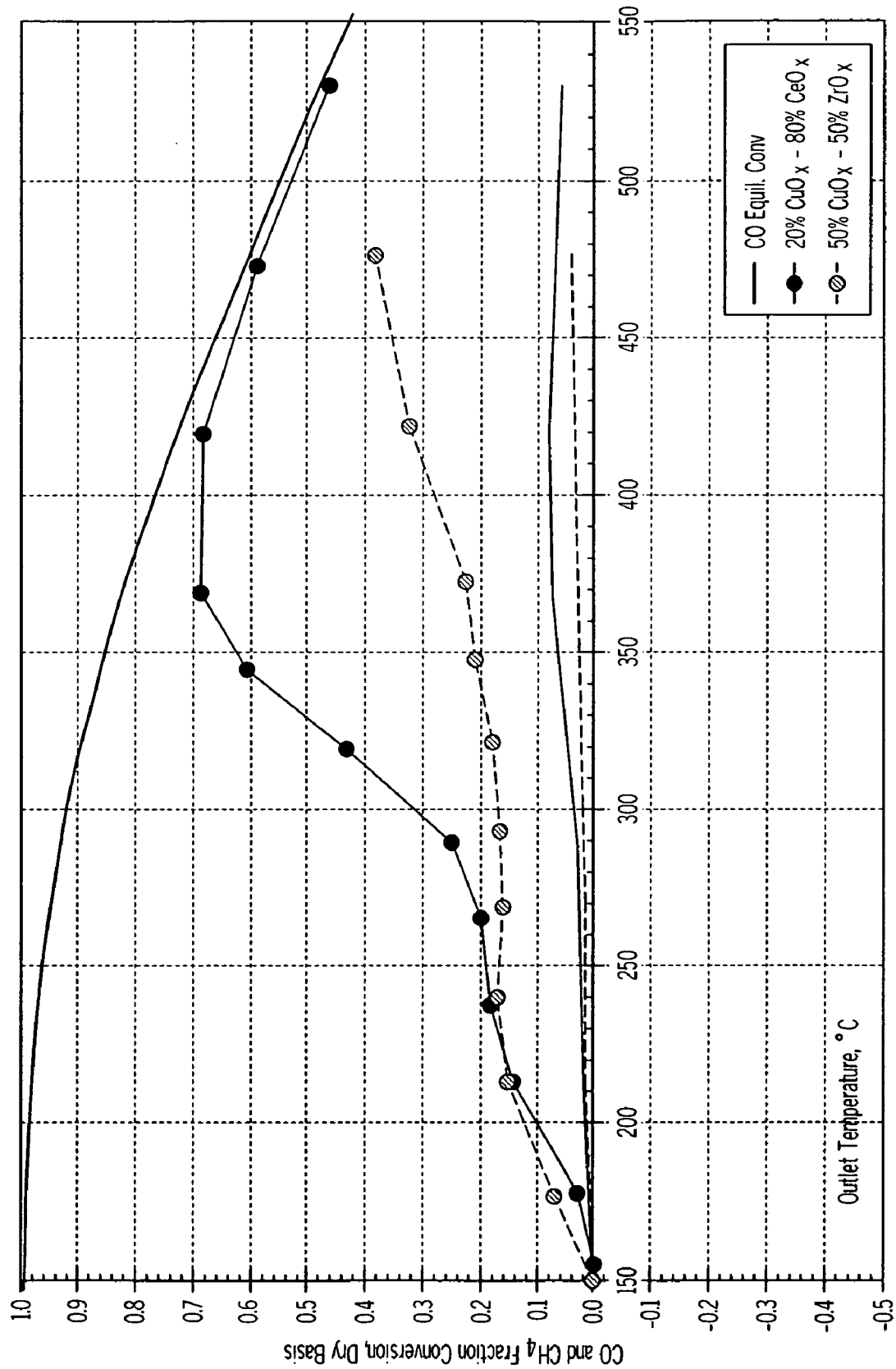
FIG. 6 is a graph showing catalyst activity and methane formation for copper oxide-cerium oxide and copper oxide-zirconium oxide catalysts of the present invention.

FIG. 6 shows the use of copper oxide-cerium oxide and copper oxide-zirconium oxide catalysts.

Figure 7:
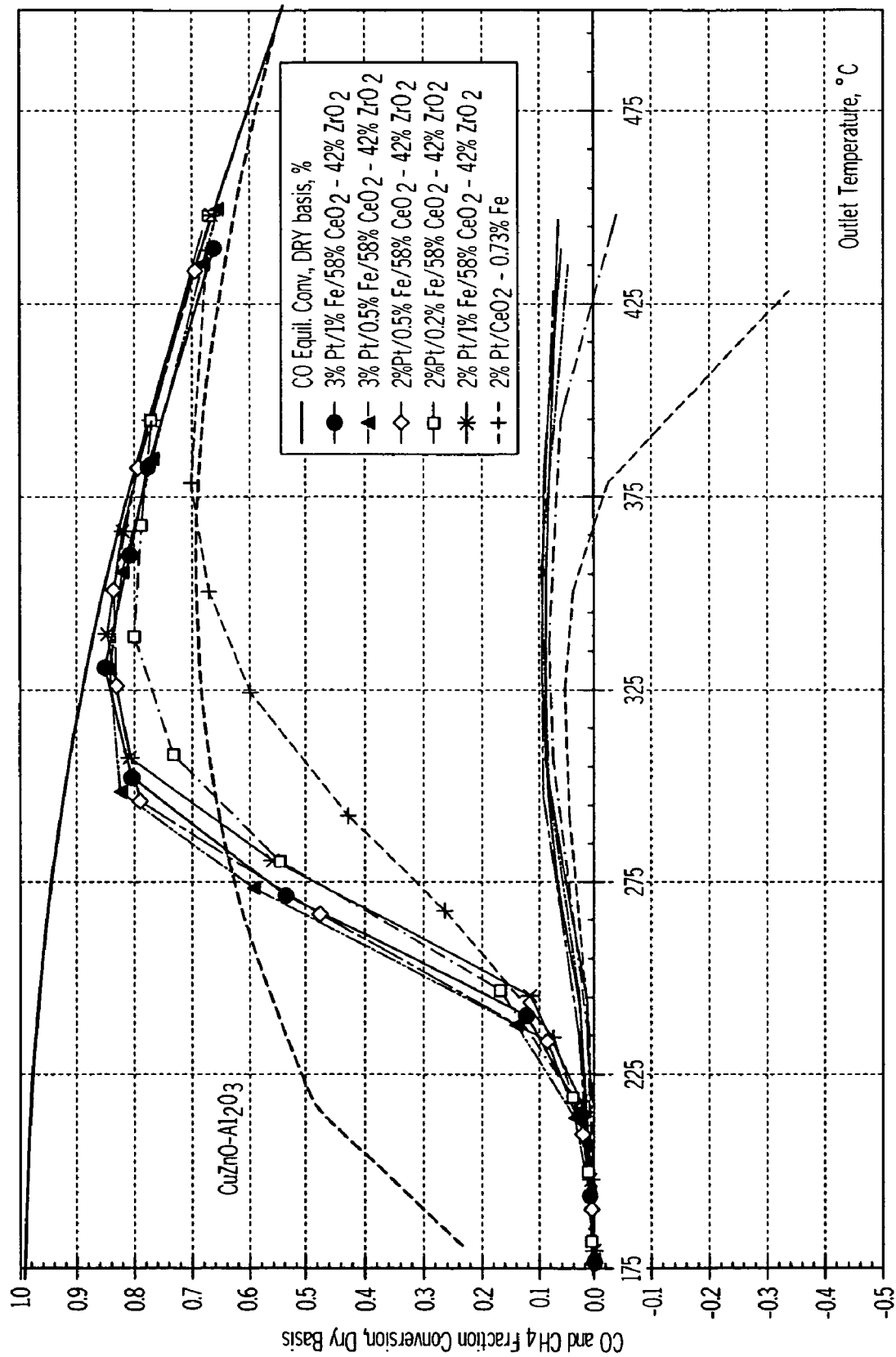
FIG. 7 is a graph showing catalyst activity and methane formation for iron-promoted cerium oxide-zirconium oxide catalysts of the present invention.

FIG. 7 shows the effect of the level of Fe as an anti-methanation agent on ceria-zirconia oxides.

Figure 8:
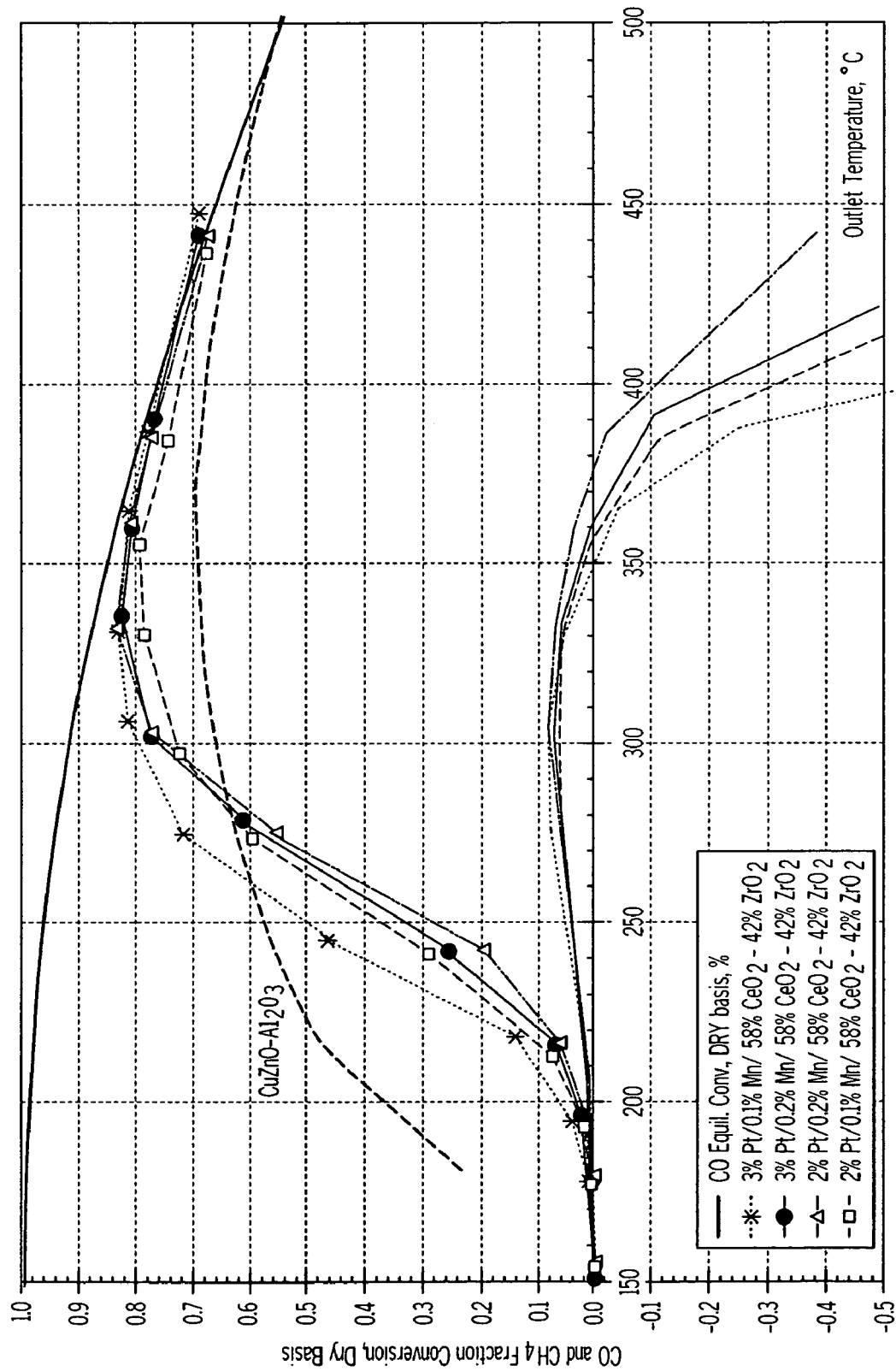
FIG. 8 is a graph showing catalyst activity and methane formation for manganese-promoted cerium oxide-zirconium oxide catalysts of the present invention.
Figure 9:
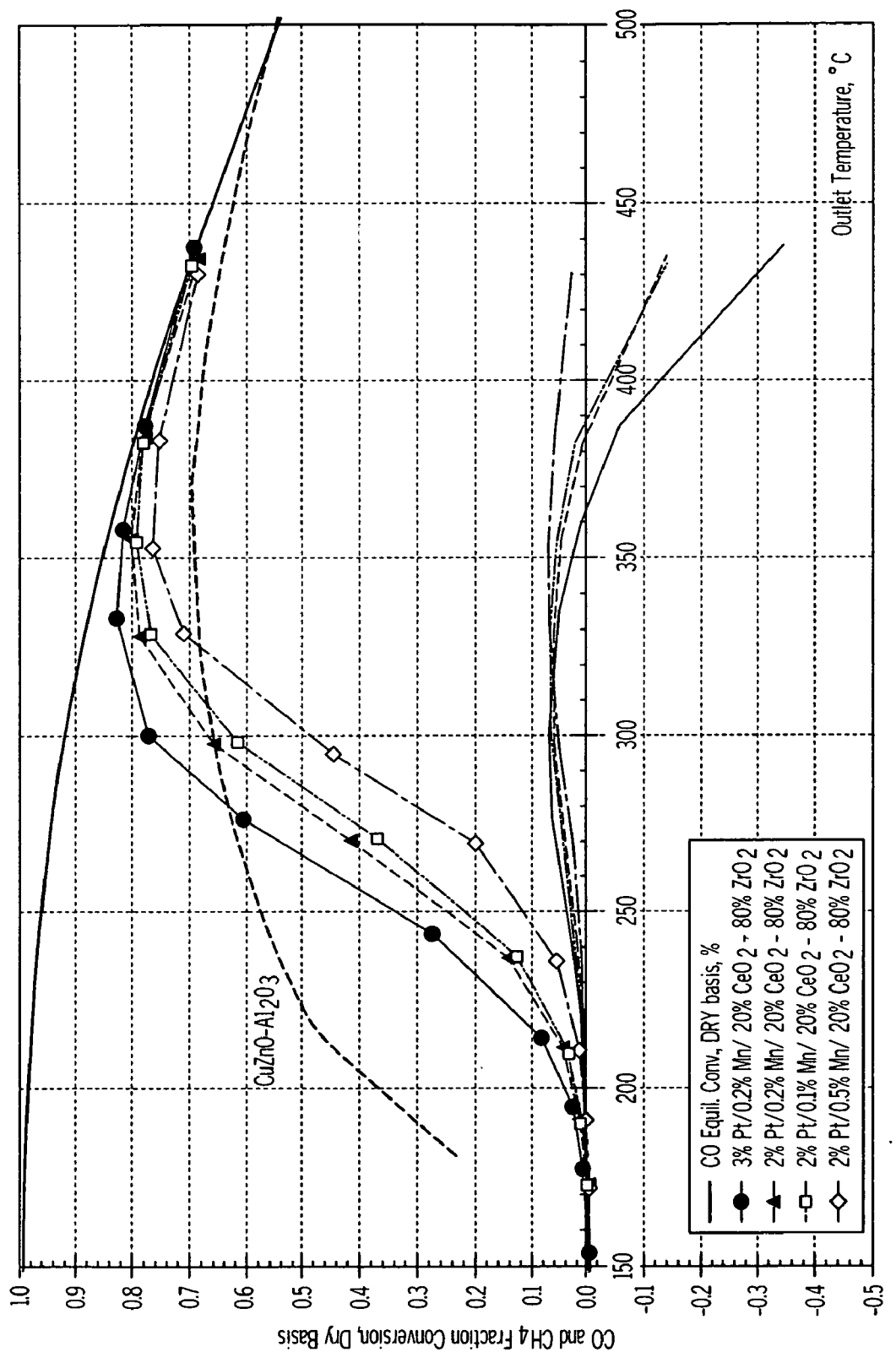
FIG. 9 is a graph showing catalyst activity and methane formation for manganese-promoted cerium oxide-zirconium oxide catalysts of the present invention.

FIGS. 8 and 9 show the effect of the level of Mn as an anti-methanation agent on ceria-zirconia oxides of different compositions.

The water gas shift catalyst systems of the present invention showed high catalytic activity for water gas shift reactions. The water gas shift catalysts showed no methanation (methane formation) over a large temperature range, i.e., from about 200° C. to about 350° C., and in some cases to about 375° C., about 400° C., about 425° C., about 450° C., about 500° C., about 550° C., or about 600° C. The maximum catalytic activity occurred at temperatures in the range of about 200° C. to about 475° C., particularly a range of about 275° C. to about 425° C.

Water gas shift catalyst systems using the cerium oxide-zirconium oxide mixed oxides showed improved catalytic performance over those using cerium oxide-lanthanum oxide mixed oxides, as well as over either cerium oxide alone or zirconium oxide alone. The cerium oxide-zirconium oxide formulations showed a decrease in the onset temperature of the water gas shift reaction (light-off temperature) compared to cerium oxide-lanthanum oxide, cerium oxide alone, and zirconium oxide alone. Although the reasons for the improved catalytic activity by the catalyst systems using cerium oxide-zirconium oxide mixed oxides are not clear and although not wishing to be bound by theory, there are several possible explanations. The cerium oxide-zirconium oxide mixed oxide may provide high thermal stability and, therefore, improved durability and long-term stability by the mixed oxide phase. A second possible explanation is that the cerium oxide-zirconium oxide mixed oxide provides improved water adsorption properties compared to cerium oxide alone, while maintaining the oxygen mobility of the cerium oxide. Another possible explanation is that there is a higher metal dispersion on cerium oxide-zirconium oxide mixed oxides than on cerium oxide when the same method of metal deposition is used.

The presence of the anti-methanation agents, such as CuOx (FIG. 6) reduces or even eliminates methanation (conversion to methane formation). The extent of the reduction of the methanation activity depends on the amount of copper, as seen from FIGS. 2 and 3. In most instances, anti-methanation agents shift the onset of methane formation to temperatures in excess of 600° C., or completely eliminate methanation.

Iron is a more efficient anti-methanating agent than manganese (compare the same ratio, 10:1, in FIGS. 7 (Pt:Fe) and 8 Pt:Mn)). Under the reaction conditions studied, Fe suppressed methanation over the entire range of temperature studied for ratios of Pt:Fe (wt.:wt.) greater than or equal to 6:1. When $CeO_2$ alone was doped with Fe in support preparation, the methanation was not suppressed, and the total activity was much lower (FIG. 7).

Under the chosen reaction conditions and for 2% Pt formulations on $CeO_2$—$ZrO_2$ (58%:42%), a ratio Fe:Pt of 1:10 is sufficient to eliminate methanation up to 425° C. (FIG. 7), while in the case of Mn, a higher ratio would be needed in to eliminate methane formation under the same reaction conditions (FIG. 8). FIG. 9 also shows that for 2% Pt formulations on $CeO_2$—$ZrO_2$ 20%:80%, a ratio of Mn:Pt of 1:4 is needed to eliminate methanation up to 425° C.

When manganese and iron are used as the anti-methanation agents, the catalyst systems are expected to be more durable against irreversible reduction based on the reoxidizing ability conferred by the redox elements in the presence of water.

While the invention has been described by reference to certain embodiments, is should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method of reducing an amount of carbon monoxide in process fuel gas in a water gas shift converter, comprising:
    placing a high activity water gas shift catalyst system into a water gas shift converter, the high activity water gas shift catalyst system consisting essentially of a noble metal; a support consisting essentially of cerium oxide, or a mixed metal oxide of cerium oxide-zirconium oxide wherein cerium oxide is present in an amount ranging from about 80% to about 20% by weight of total metal oxide and wherein zirconitmi oxide is present in an amount ranging from about 20% to about 80% by weight of total metal oxide, or a mixed metal oxide of cerium oxide-lanthanum oxide wherein cerium oxide is present in an amount ranging from about 80% to about 20% by weight of total metal oxide and wherein lanthanum oxide is present in an amount ranging from about 20% to about 80% by weight of total metal oxide; an anti-methanation agent consisting essentially of copper, or manganese, or iron, or combinations thereof; and a promoter comprising alkali metals or alkaline earth metals or combinations thereof; and passing the process fuel gas through the water gas shift converter in effective contact with the high activity water gas shift catalyst system and converting a portion of the carbon monoxide in the process fuel gas into carbon dioxide and hydrogen by a water gas shift reaction with no methane formation at a temperature in a range of about 200° C. to about 350° C.

2. The method of claim 1 wherein the anti-methanation agent comprises copper in an amount ranging from about 0.1% to about 10% by total weight of catalyst.

3. The method of claim 1 wherein the anti-methanation agent comprises manganese in an amount ranging from about 0.1% to about 5% by total weight of catalyst.

4. The method of claim 1 wherein the anti-methanation agent comprises an iron compound in an amount ranging from about 0.1% to about 5% by total weight of catalyst.

5. The method of claim 1 wherein the noble metal is platinum, palladium, ruthenium, iridium, or mixtures thereof.

6. The method of claim 1 wherein the noble metal is present in an amount ranging from about 1% to about 4% by weight of total catalyst.

7. The method of claim 1 wherein the promoter is cesium, lithium, rubidium, potassium, magnesium, strontium, barium, or combinations thereof.

8. The method of claim 1 wherein the promoter is present in an amount of between about 0.1% and about 1% by weight of total catalyst.

9. The method of claim 1 wherein there is no methane formation at a temperature in a range of about 200° C. to about 425° C.

10. The method of claim 1 wherein there is no methane formation at a temperature in a range of about 200° C. to about 500° C.

11. The method of claim 1 wherein there is no methane formation at a temperature in a range of about 200° C. to about 600° C.

12. The method of claim 1 wherein passing the process fuel gas through the water gas shifi convener is performed at a temperature in the range of about 200° C. to about 475° C.

13. The method of claim 1 wherein passing the process fuel gas through the water gas shift converter is performed at a temperature in the range of about 250° C. to about 425° C.

14. A method of reducing an amount of carbon monoxide in process fuel gas in a water gas shift converter, comprising:
    placing a high activity water gas shift catalyst system into a water gas shift converter, the high activity water gas shift catalyst system consisting essentially of a noble metal; a support consisting essentially of cerium oxide, or a mixed metal oxide of cerium oxide-zirconium oxide wherein cerium oxide is present in an amount ranging from about 80% to about 20% by weight of total metal oxide and wherein zirconium oxide is present in an amount ranging from about 20% to about 80% by weight of total metal oxide, or a mixed metal oxide of cerium oxide-lanthanum oxide wherein cerium oxide is present in an amount ranging from about 80% to about 20% by weight of total metal oxide and wherein lanthanum oxide is present in an amount ranging from about 20% to about 80% by weight of total metal oxide; an anti-methanation agent consisting essentially of copper present in an amount ranging from about 0.1% to about 10% by total weight of catalyst, or manganese present in an amount ranging from about 0.1% to about 5% by total weight of catalyst, or iron in an amount ranging from about 0.1% to about 5% by total weight of catalyst, or combinations thereof; and a promoter comprising alkali metals or alkaline earth metals or combinations thereof, the promoter present in an amount ranging from about 0.1% to about 1% by weight of total catalyst; and passing the process fuel gas through the water gas shift converter in effective contact with the high activity water gas shift catalyst system and converting a portion of the carbon monoxide in the process fuel gas into carbon dioxide and hydrogen by a water gas shift reaction with no methane formation at a temperature in a range of about 200° C. to about 350° C.

15. A high activity water gas shift catalyst system consisting essentially of:
a noble metal;
a support consisting essentially of cerium oxide, or a mixed metal oxide of cerium oxide-zirconium oxide wherein cerium oxide is present in an amount ranging from about 80% to about 20% by weight of total metal oxide and wherein zirconium oxide is present in an amount ranging from about 20% to about 80% by weight of total metal oxide, or a mixed metal oxide of cerium oxide-lanthanum oxide wherein cerium oxide is present in an amount ranging from about 80% to about 20% by weight of total metal oxide and wherein lanthanum oxide is present in an amount ranging from about 20% to about 80% by weight of total metal oxide;
an anti-methanation agent consisting essentially of copper, or manganese, or iron, or combinations thereof, and
a promoter comprising alkali metals or alkaline earth metals or combinations thereof,
wherein the high activity water gas shift catalyst system has no methane formation at a temperature in a range of about 200° C. to about 350° C.

16. The high activity water gas shift catalyst system of claim 15 wherein the anti-methanation agent comprises copper in an amount ranging from about 0.1% to about 10% by total weight of catalyst.

17. The high activity water gas shift catalyst system of claim 15 wherein the anti-methanation agent comprises a manganese in an amount ranging from about 0.1% to about 5% by total weight of catalyst.

18. The high activity water gas shift catalyst system of claim 15 wherein the anti-methanation agent comprises iron in an amount ranging from about 0.1% to about 5% by total weight of catalyst.

19. The high activity water gas shift catalyst system of claim 15 wherein the noble metal is platinum, palladium, ruthenium, iridium, or mixtures thereof.

20. The high activity water gas shift catalyst system of claim 19 wherein the noble metal is present in an amount ranging from about 1% to about 4% by weight of total catalyst.

21. The high activity water gas shift catalyst system of claim 15 wherein the promoter cesium, lithium rubidium, potassium, magnesium, strontium, barium, or combinations thereof.

22. The high activity water gas shift catalyst system of claim 15 wherein the promoter is present in an amount of between about 0.1% and about 1% by weight of total catalyst.

23. The high activity water gas shift catalyst system of claim 15 wherein there is no methane formation at a temperature in a range of about 200° C. to about 425° C.

24. The high activity water gas shift catalyst system of claim 15 wherein there is no methane formation at a temperature in a range of about 200° C. to about 500° C.

25. The high activity water gas shift catalyst system of claim 15 wherein the high activity water gas shift catalyst system has no methane formation at a temperature in a range of about 200° C. to about 600° C.

26. A method of reducing an amount of carbon monoxide in process fuel gas in a water gas shift converter, comprising:
placing a high activity water gas shift catalyst system into a water gas shift converter, the high activity water gas shift catalyst system comprising a noble metal; a support consisting essentially of cerium oxide, or a mixed metal oxide of cerium oxide-zirconium oxide wherein cerium oxide is present in an amount ranging from about 80% to about 20% by weight of total metal oxide and wherein zirconium oxide is present in an amount ranging from about 20% to about 80% by weight of total metal oxide, or a mixed metal oxide of cerium oxide-lanthanum oxide wherein cerium oxide is present in an amount ranging from about 80% to about 20% by weight of total metal oxide and wherein lanthanum oxide is present in an amount ranging from about 20% to about 80% by weight of total metal oxide; an anti-methanation agent comprising copper; and a promoter comprising alkali metals or alkaline earth metals or combinations thereof; and
passing the process fuel gas through the water gas shift converter in effective contact with the high activity water gas shift catalyst system and converting a portion of the carbon monoxide in the process fuel gas into carbon dioxide and hydrogen by a water gas shift reaction with no methane formation at a temperature in a range of about 200° C. to about 350° C.

27. The method of claim 26 wherein the copper is present in an amount ranging from about 0.1% to about 10% by total weight of catalyst.

28. The method of claim 26 wherein the noble metal is platinum, palladium, ruthenium, iridium, or mixtures thereof.

29. The method of claim 26 wherein the noble metal is present in an amount ranging from about 1% to about 4% by weight of total catalyst.

30. The method of claim 26 wherein the promoter is cesium, lithium, rubidium, potassium, magnesium, strontium, barium, or combinations thereof.

31. The method of claim 26 wherein the promoter is present in an amount of between about 0.1% and about 1% by weight of total catalyst.

32. The method of claim 26 wherein there is no methane formation at a temperature in a range of about 200° C. to about 425° C.

33. The method of claim 26 wherein there is no methane formation at a temperature in a range of about 200° C. to about 500° C.

34. The method of claim 26 wherein there is no methane formation at a temperature in a range of about 200° C. to about 600° C.

35. The method of claim 26 wherein passing the process fuel gas through the water gas shift converter is performed at a temperature in the range of about 200° C. to about 475° C.

36. A high activity water gas shift catalyst system comprising:
a noble metal;
a support consisting essentially of cerium oxide, or a mixed metal oxide of cerium oxide-zirconium oxide wherein cerium oxide is present in an amount ranging from about 80% to about 20% by weight of total metal oxide and wherein zirconium oxide is present in an amount ranging from about 20% to about 80% by weight of total metal oxide, or a mixed metal oxide of cerium oxide-lanthanum oxide wherein cerium oxide is present in an amount ranging from about 80% to about 20% by weight of total metal oxide and wherein lanthanum oxide is present in an amount ranging from about 20% to about 80% by weight of total metal oxide;

an anti-methanation agent comprising copper; and a promoter comprising alkali metals or alkaline earth metals or combinations thereof, wherein the high activity water gas shift catalyst system has no methane formation at a temperature ma range of about 200° C. to about 350° C.

37. The high activity water gas shift catalyst system of claim 36 wherein the copper is present in an amount ranging from about 0.1% to about 10% by total weight of catalyst.

38. The high activity water gas shift catalyst system of claim 36 wherein the noble metal is platinum, palladium, ruthenium, iridium, or mixtures thereof.

39. The high activity water gas shift catalyst system of claim 36 wherein the noble metal is present in an amount ranging from about 1% to about 4% by weight of total catalyst.

40. The high activity water gas shift catalyst system of claim 36 wherein the promoter is cesium, lithium, rubidium, potassium, magnesium, strontium, barium, or combinations thereof.

41. The high activity water gas shift catalyst system of claim 36 wherein the promoter is present in an amount of between about 0.1% and about 1% by weight of total catalyst.

42. The high activity water gas shift catalyst system of claim 36 wherein there is no methane formation at a temperature in a range of about 200° C. to about 425° C.

43. The high activity water gas shift catalyst system of claim 36 wherein there is no methane formation at a temperature in a range of about 200° C. to about 500° C.

44. The high activity water gas shift catalyst system of claim 36 wherein the high activity water gas shift catalyst system has no methane formation at a temperature in a range of about 200° C. to about 600° C.

* * * * *